Nov. 22, 1955 E. L. DECKER Re. 24,092

WEIGHT SENSING ATTACHMENT FOR CABLE ANCHORS

Original Filed Nov. 27, 1950

INVENTOR.
ELMER L. DECKER,
BY
Paul A. Weilein
ATTORNEY.

United States Patent Office

Re. 24,092
Reissued Nov. 22, 1955

24,092

WEIGHT SENSING ATTACHMENT FOR CABLE ANCHORS

Elmer L. Decker, Long Beach, Calif., assignor to Martin-Decker Corporation, Long Beach, Calif., a corporation of Delaware Original No. 2,700,304, dated January 25, 1955, Serial No. 197,699, November 27, 1950. Application for reissue September 23, 1955, Serial No. 536,323

14 Claims. (Cl. 73—143)

Matter enclosed in heavy brackets [ ] appears in the original patent but forms no part of this reissue specification; matter printed in italics indicates the additions made by reissue.

This invention relates in general to apparatus for indicating the load or weight on the lines of cable hoist systems employed in connection with rotary well drilling rigs, and in particular to the conversion of cable anchoring devices for such lines to combined weight indicating and cable anchoring units.

Cable anchors of the type to which this invention relates have gone into extensive use and comprise a body member adapted to be fixed to a stationary support, a snubbing drum mounted [for limited turning movement] on the body member and adapted to receive a plurality of windings of the cable, and a releasable clamp fixed on the body member apart from the drum for dead-ending the cable after the cable has been wound around the drum. The drum relieves the strain on the clamp and the clamp permits of feeding fresh cable into the system as required without dismantling the anchoring device.

It is the primary object of this invention to provide a weight sensing adapter unit for converting a cable anchor of the character described to a combined cable anchoring and weight indicating apparatus without necessitating any change in the construction of the cable anchor.

It is another object of this invention to provide a simply constructed and inexpensive adapter unit such as described, which may be readily interposed between a stationary supporting structure and a cable anchor of the type described, as a mounting therefor and to convert the anchor for use as a weight indicator when connected with a suitable indicator, the resultant converted unit having all of the advantages of its cable anchoring component plus the advantage of accurate indication of the weight on the cable anchored thereto.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figure 4:
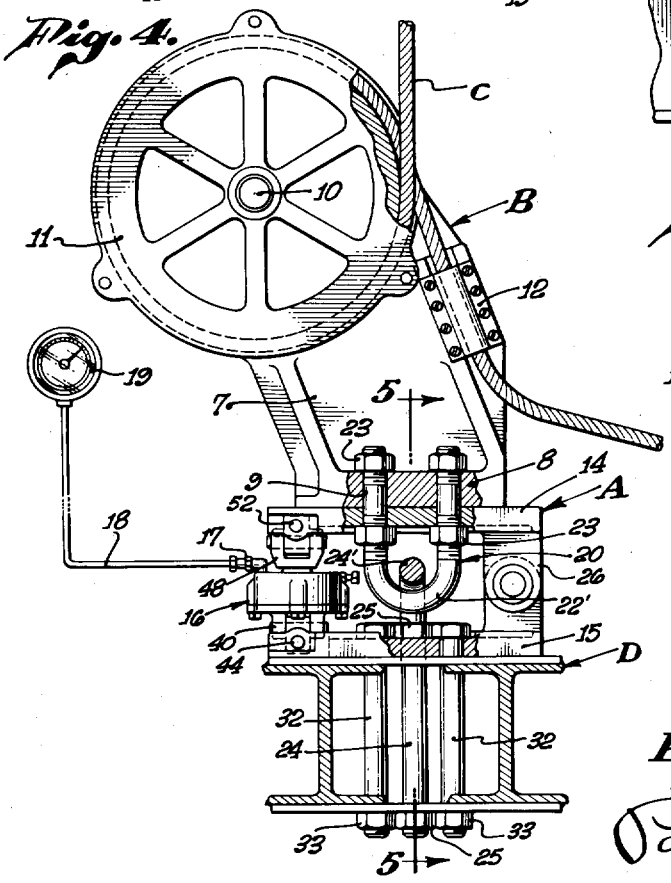
Fig. 4 is an enlarged fragmentary side elevation partly in section of the sensing unit of this invention as it would appear when in use as a mounting for a cable anchor and as connected with a weight indicator.
Figure 6:
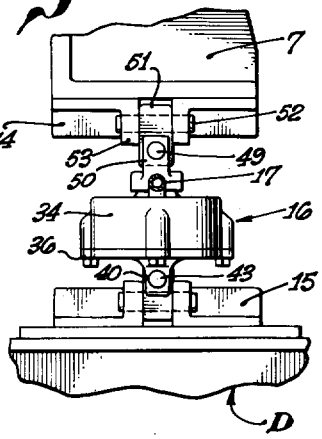
Fig. 6 is a fragmentary front elevational view of the apparatus shown in Fig. 4.

The present invention as shown in the accompanying drawing comprises a weight sensing unit A for converting a cable anchor B of the type shown in Fig. 4, to a combined cable anchor and weight indicator, the cable C being for example, the dead line of a hoist system for a rotary well drilling rig.

The sensing unit A hereof is designed for use in connection with a cable anchor of the type which includes an upstanding body member 7 having a base portion 8 at its lower end provided with openings 9 whereby normally the base portion would be secured to a stationary support such as the structure D here shown and which may be a part of or secured on the well derrick structure or drill platform of a well. At its upper end the body member 7 supports [for rotation on an axle 10] *about an axis 10* a snubbing drum 11 adapted to have a plurality of loops of the cable C wound thereon.

The cable C is dead-ended on the body member 7 by means of a releasable cable clamp 12 located below the axis of the drum 11 and to one side of the drum. The cable extends past the clamp to a reel or spool of cable not shown, whereby fresh cable may be introduced into the system as required without dismantling the cable anchor, it only being necessary to loosen the clamp and extend fresh cable into the system through the device.

Essentially the weight sensing adapter A of this invention comprises a tiltable mounting member for the cable anchor unit B, means for tiltably securing the mounting member on the support D, and a sensing element which responds to bodily movement of anchor unit and mounting member incident to loads imposed on the cable and includes means for operatively connecting the sensing element with an indicator. As here provided the sensing adapter includes a substantially rectangular plate-like mounting member 14 pivotally or hingedly connected at one end to one end of a similar plate-like base member 15 so as to overlie the latter member.

A hydraulic sensing element 16 is mounted between the members 14 and 15 and connected with the other ends thereof so as to respond to tilting movement of the mounting member 14. Means in the form of a fitting 17 is provided on the sensing element 16 whereby an operative connection may be made, as by means of a fluid line 18, with a weight indicator 19. The indicator may be located at any suitable point in sight of the operators of the drilling rig.

Movement limiting means 20 is provided between the members 14 and 15 to limit the tilting movement of the member 14 within safe limits in consideration of the limited movement of the sensing element, to prevent damage of the latter.

Figure 5:
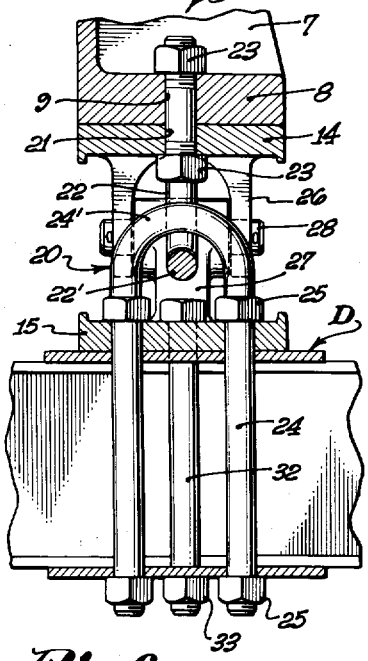
Fig. 5 is an enlarged sectional view taken substantially on the line 5—5 of Fig. 4.

The mounting member 14 is provided with openings 21 adapted to register with the openings 9 in the base portion 8 of the anchor unit B whereby a U-bolt 22 and nuts 23 may be employed as shown in Figures 4 and 5 to rigidly secure the base portion 8 to the member 14 with the loop portion 22' of the bolt depending below the plate as a part of the movement-limiting means 20. A similar U-bolt 24 is secured by nuts 25 on the stationary support D, extends through the member 15, and has its loop portion 24' to complete the means 20, for limiting the tilting of the member 14.

Figure 3:
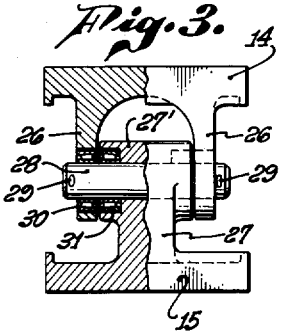
Fig. 3 is an end elevation of the unit partly in section looking in the direction of the arrow 3 of Fig. 1.

At one end, the member 14 is provided with opposed depending and apertured ears 26 which embrace an upstanding ear 27 on the base member 15, the ear 27 having an enlarged transversely apertured head portion 27', the aperture through which registers with the apertures in the ears 26 to accommodate a pivot pin 28 held in place by cotter pins 29. Suitable anti-friction bearings 30 and 31 are seated in the ears 26 and opposite ends of the head 27' respectively, as shown in Fig. 3.

The base member 15 is secured to the support structure D by means of bolts 32 and nuts 33, the U-bolts 24 and nuts 25 also serving to secure the base member to the support as will be seen with reference to Figs. 4 and 5.

Figure 1:
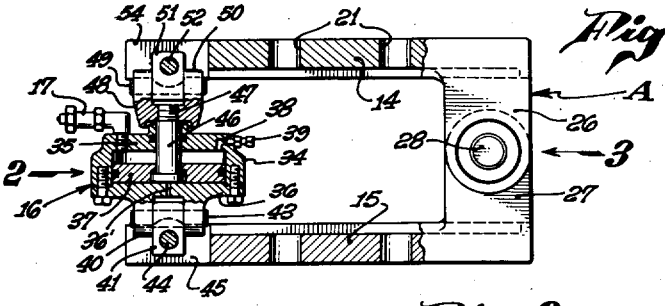
Fig. 1 is a fragmentary side elevational view partly in section of a weight sensing unit constructed in accordance with this invention.

The sensing element 16, as best shown in Fig. 1, includes a cylinder 34 having an integral end wall 35, and a removable end wall 36. A piston 37 is operable in the cylinder between the end walls thereof, against a body of fluid above the piston. A filling opening 38 in the cylinder, closed by a removable plug 39, provides for charging the cylinder and associated hydraulic system with desired amounts of fluid to regulate the weight indicating action best to suit the conditions at hand.

Figure 2:
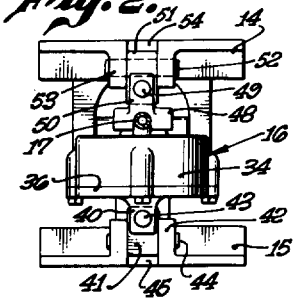
Fig. 2 is an end elevation of the unit looking in the direction of the arrow 2 in Fig. 1.

The removable wall 36 of the cylinder 34 has a vent port 36' to prevent entrapped air or fluid from interfering with the movement of the piston 37. This wall is coupled to the base member 15 by means of a pair of depending ears 40 thereon, a pivot block 41, ears 42 on the base member 15 and pivot pins 43 and 44 respectively pivotally connecting the ends of the block with said ears. These pivot pins are normal one to the other whereby a universal joint is provided between the lower end of the cylinder 34 and the base member 15. In this connection, it will be seen with reference to Figs. 1 and 2 that the base member 15 is provided with a slot 45 between the ears 42 permitting free movement of the lower end of the block 41.

The piston 37 has a piston rod 46 which is slidable through the end wall 35 of the cylinder 34 and is threadedly connected as at 47 with yoke 48. Pivoted on a pin 49 between ears 50 on the yoke, is a pivot block 51 corresponding to the block 41. The upper end of the block 51 is pivoted by means of a pin 52 to ears 53 depending from the mounting member 14, there being a slot 54 in the member 14 to accommodate the block 51. The pins 49 and 52 are arranged at right angles to one another, thereby providing a universal joint between the upper end of the sensing element 16 and the mounting member 14. In mounting the element 16 with two universal joints as here provided, no critical machining is required as to the mounting means and these joints compensate for any misalignment of the parts and prevent damage of the sensing element which might otherwise take place due to angular movement of the member 14 relative to the base member 15.

The anchor unit B mounted as here provided on the unit A, will move bodily on the mounting member 14 responsive to variations in the load or pull on the cable C and as a result of this movement, the member 14 will cause the piston 37 to move and transmit through the fluid contained in the cylinder, the line 18 and the indicator 19, forces for actuating the indicator to show the load or weight on the cable. The drum will relieve the strains on the cable clamp. The clamp when loosened makes it possible readily to extend fresh cable into the system without disturbing or in any manner adjusting the combined anchor and indicator other than loosening of the clamp.

It is important to note that the opposed mounting members 14 and 15 are connected for relative movement about an axis which is below the axis of the snubbing drum 11 of the cable anchor mounted on the cable anchor supporting surface of the plate 14, and that the plate 15 is provided with a mounting surface adapted to be secured to the supporting structure D. Thus, the weight sensing attachment as here provided constitutes a simple, compact and inexpensive unit subject to ready application to a cable anchor of the type here shown for converting the cable anchor to a combined weight indicator and cable anchor having all of the efficiency of the cable anchor as heretofore used, plus provision for an accurate indication of the weight on the cable anchored thereto.

I claim:

1. In a weight sensing unit for attachment to a cable anchor, a pair of opposed members, means connecting said members for relative pivotal movement, means between and connected with said members for limiting relative movement thereof, one of said opposed members being adapted to be fixed to a stationary support, means on the other of said members providing a seat for the body member of said cable anchor, said other member having means providing for the fixation of said body member to said seat so as to prevent relative movement between said seat and said body member, a hydraulic sensing element connected with said opposed members for operation responsive to relative movement between said opposed members, and means on the sensing element for fixing a connection thereof with an indicator.

2. In a sensing unit for converting a cable anchoring device to a combined weight indicating and cable anchoring unit for a load sustaining cable, wherein said anchoring device is provided with a base adapted to be immovably fixed to a support, a pair of opposed members, means connecting said members for relative pivotal movement, means between and connected with said members for limiting relative movement thereof, said members being adapted to be mounted between the base of said cable anchoring device and a stationary support, with one of said members fixed to the stationary support and the other member immovably fixed to the base of the cable anchoring device, and a load sensing element mounted between and fixedly connected with said opposed members for operation responsive to movement of the opposed members on which said cable anchoring device is mounted.

3. In a sensing unit for converting a cable anchoring device to a combined weight indicating and cable anchoring unit for a load sustaining cable wherein said device is provided with a base, a pair of opposed and hingedly connected members adapted to be mounted between the cable anchoring device and a stationary support with one of said members fixed to the stationary support and the other member immovably fixed to the base of the cable anchoring device, a sensing element means forming universal joints connecting said element with said opposed members, said sensing element operating responsive to relative movement between said members in a direction away from one another, means on said element for operatively connecting said element with an indicator, and means located between the hinged connection of said members and said sensing element for limiting relative movement between said opposed members.

4. In combination, a snubbing drum, a body member on which said drum is mounted [for limited rotary movement], a cable clamp fixed on said body member for dead-ending a load-sustaining cable after the winding of the cable around the drum, a tiltable mounting member, means fixing said body member to said mounting member for movement therewith and against movement relative thereto, means for tiltably mounting said mounting member on a stationary support, a load sensing element mounted between said support and said tiltable member for operation responsive to the tilting of said tiltable member and body member as a unit, and means on said sensing element for operatively connecting the sensing element with an indicator.

5. In a sensing unit for converting a cable anchoring device to a combined weight indicating and cable anchoring unit for a load sustaining cable, a pair of opposed members, means connecting said members for relative movement, said members being adapted to be mounted between the cable anchoring device and a stationary support, with one of said members fixed to the stationary support and the other member fixed to the cable anchoring device, a load sensing element mounted between and connected with said opposed members for operation responsive to movement of said other member, means on the sensing element for connecting the sensing element with an indicator, and cooperative stop members fixed to and between said opposed members for limiting relative movement of said members, one of said stop members being operable for securing said other of said opposed members to said cable anchoring device.

6. In a sensing unit for converting a cable anchoring device to a combined weight indicating and cable anchoring unit, a pair of opposed members, means connecting said members for relative pivotal movement, said members having openings therein providing for the fastening of one member to a stationary support and providing for the fastening of the anchoring device upon the other member, said other member having the uppermost surface thereof formed as a seat for said anchoring device, a hydraulic sensing unit comprising a piston connected to one of said members and a cylinder connected with the other of said members, means connected with said members between said first named means and said sensing unit for limiting relative movement between said members, and means on said cylinder for effecting an operative connection thereof with an indicator.

7. In a sensing unit for converting a cable anchoring device to a combined weight indicating and cable anchoring unit, a pair of opposed members, means connecting said members for relative movement, said members having openings therein providing for the fastening of one member to a stationary support and providing for the fastening of the anchoring device upon the other member, means connected with members for limiting relative movement thereof, a hydraulic sensing unit comprising a piston, means forming a universal joint connecting said piston with one of said members, a cylinder in which the piston is operable, means forming a universal joint connecting the cylinder with the other of said members, and means on the cylinder for effecting an operative connection of the sensing element with an indicator.

8. In a weight sensing unit for attachment to a cable anchor, the cable anchor comprising a snubbing drum mounted [for turning] on a body member and adapted to receive a plurality of windings of a cable, and a cable clamp on said body member for dead-ending the cable after the winding thereof around the drum; said sensing unit including a pair of opposed members, means connecting said members for relative pivotal movement, one of said opposed members being adapted to be fixed to a stationary support, the other of said members being adapted to serve as a seat for the body member of said cable anchor and having means providing for the fixation thereof to said body member for movement therewith, a hydraulic sensing element disposed between and connected with said opposed members for operation responsive to relative movement between said opposed members, means on the sensing element for effecting an operative connection thereof with an indicator, and interconnected stop members connected with said opposed members between said first named means and said sensing unit for limiting relative movement of said opposed members.

9. In combination, a snubbing drum, a body member on which said drum is mounted [for limited rotary movement], a cable clamp fixed on said body member for dead-ending a load-sustaining cable at a point to one side of said drum, a tiltable mounting member, means fixing said body member to said mounting member for movement therewith and against movement relative thereto, means for tiltably mounting said mounting member on a stationary support, a load sensing element connected with said tiltable member for operation responsive to the tilting thereof and the body member as a unit, means on said sensing element for operatively connecting the sensing element with an indicator, and means cooperable with the means for fixing said body member to said mounting member for limiting tilting movement of said mounting member.

10. In a weight sensing unit for attachment to a cable anchor, the cable anchor comprising a snubbing drum mounted [for turning] on a body member and adapted to receive a plurality of windings of a cable, and a cable clamp on said body member for dead-ending the cable after the winding thereof around the drum; said sensing unit including a pair of opposed members, means connecting said members for relative movement about an axis below the axis of said drum, one of said opposed members having a surface adapted to be fixed to a stationary support, means providing on the uppermost part of the other of said members a surface adapted to be secured to the body member of said cable anchor, a hydraulic sensing element connected with said opposed members for operation responsive to relative movement between said opposed members, means on the sensing element for effecting an operative connection thereof with an indicator, interconnected elements connected with said members for limiting relative movement thereof, and means including one of said elements for fixing said body member to said other member.

11. In combination, a snubbing drum, a body member on which said drum is mounted [for rotary movement], a cable clamp fixed on said body member for dead-ending a load-sustaining cable at a point to one side of said drum, a tiltable mounting member, means fixing said body member to said mounting member for movement therewith and against movement relative thereto, means mounting said mounting member for movement about an axis beneath said body member, a load sensing element pivotally connected with said tiltable member and said last named means, and means on said sensing element for operatively connecting the sensing element with an indicator.

12. In a sensing unit for converting a cable anchoring device to a combined weight indicating and cable anchoring unit for a load sustaining cable, a pair of opposed members, one of which has a surface adapted to mount the cable anchor, means connecting said members for relative pivotal movement about an axis beneath said cable anchor, means between and connected with said members for limiting relative movement thereof, the other of said members being adapted to be fixed to a stationary support, and a hydraulic load sensing element pivotally connected with said opposed members for operation responsive to movement of the opposed member on which said cable anchoring device is mounted, said connecting means and said element being respectively located adjacent the ends of said members, and means on the sensing element for connecting the sensing element with an indicator.

13. In a sensing unit for converting a cable anchoring device to a combined weight indicating and cable anchoring unit for a load sustaining cable, a pair of opposed members, said members being adapted to be mounted between the cable anchoring device and a stationary support, with one of said members having a surface fixed to the stationary support and the other member having a surface fixed to the cable anchoring device, means pivotally connecting said members between said surfaces; means between and connected with said members for limiting relative movement thereof, a load sensing element mounted between and pivotally connected with corresponding ends of said opposed members for operation responsive to movement of the member on which said cable anchoring device is mounted, means on the sensing element for connecting the sensing element with an indicator, and means for limiting relative movement of said members.

14. In a sensing unit for converting a cable anchoring device to a combined weight indicating and cable anchoring unit, a pair of opposed members, said members having openings therein providing for the fastening of one member to a stationary support and for the fastening of the anchoring device upon the other member, means connecting said other member with said one member for movement upwardly therefrom about an axis below said cable anchor; means for limiting such movement of said other member, a hydraulic sensing unit comprising a piston, means forming a universal joint connecting said piston with said other member, a cylinder in which the piston is operable, means forming a universal joint connecting said cylinder with said one member, and means on the cylinder for effecting an operative connection of the sensing element with an indicator.

References Cited in the file of this patent or the original patent

UNITED STATES PATENTS

| | | |
|---|---|---|
| 680,371 | Brittan | Aug. 13, 1901 |
| 1,692,057 | Smith | Nov. 20, 1928 |
| 1,934,201 | Miller | Nov. 7, 1933 |
| 2,025,928 | Wunsch | Dec. 31, 1935 |
| 2,235,279 | Bunker | Mar. 18, 1941 |
| 2,282,685 | Timbs | May 12, 1942 |
| 2,349,228 | Wolff | May 16, 1944 |
| 2,488,070 | Spalding | Nov. 15, 1949 |